July 19, 1938.  A. ROHRBACH  2,123,916
AIRCRAFT
Original Filed Aug. 8, 1933   11 Sheets-Sheet 1

INVENTOR.
Adolf Rohrbach.
BY Edwards, Bower & Pool
ATTORNEYS.

July 19, 1938.   A. ROHRBACH   2,123,916
AIRCRAFT
Original Filed Aug. 8, 1933   11 Sheets-Sheet 2
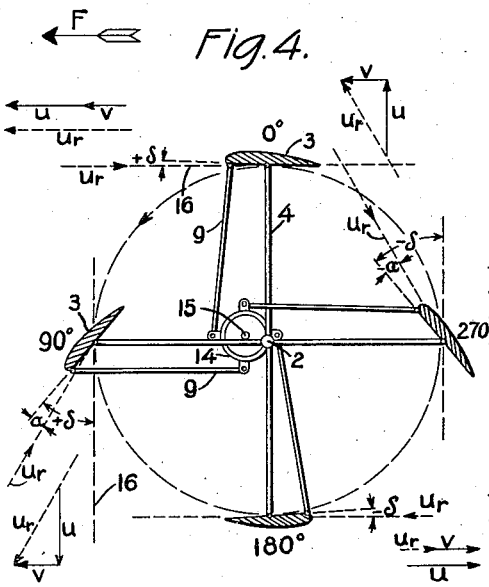
Fig. 4.
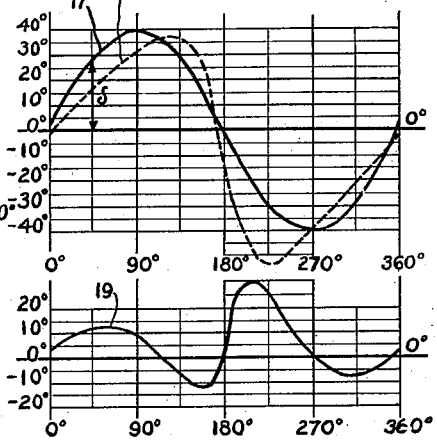
Fig. 5.
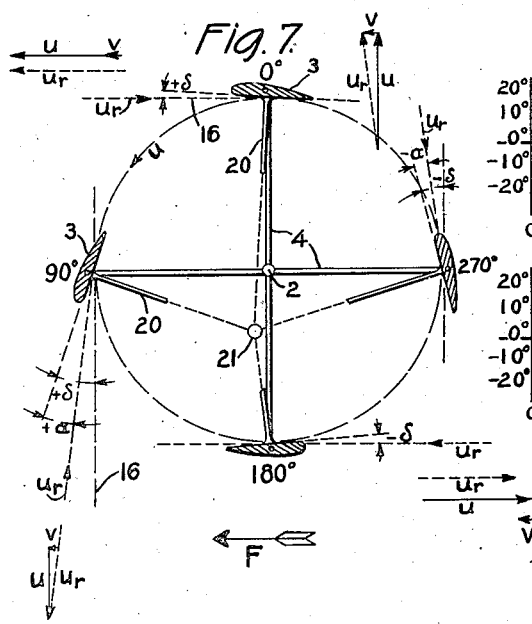
Fig. 7.
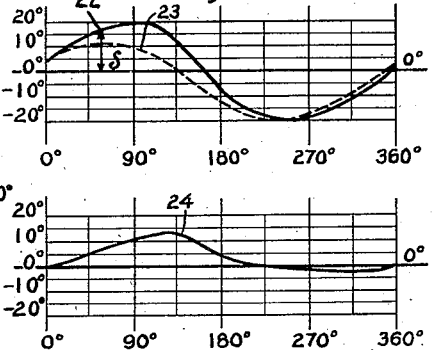
Fig. 8.
Fig. 6.
Fig. 9.
INVENTOR.
Adolf Rohrbach.
BY
Edwards, Bower & Pool
ATTORNEYS.

July 19, 1938.  A. ROHRBACH  2,123,916
AIRCRAFT
Original Filed Aug. 8, 1933  11 Sheets-Sheet 3

INVENTOR.
Adolf Rohrbach.
BY Edwards, Bower & Pool
ATTORNEYS.

July 19, 1938.  A. ROHRBACH  2,123,916
AIRCRAFT
Original Filed Aug. 8, 1933   11 Sheets-Sheet 4
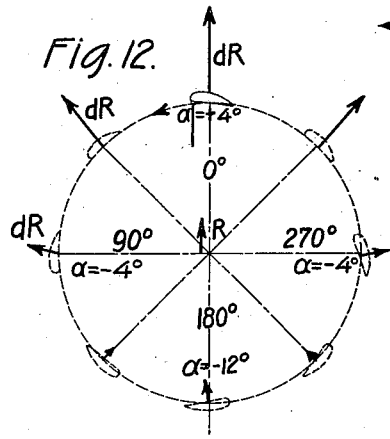
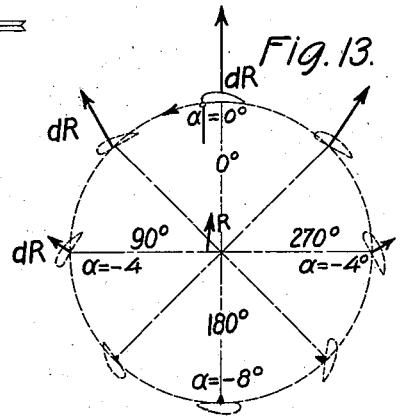
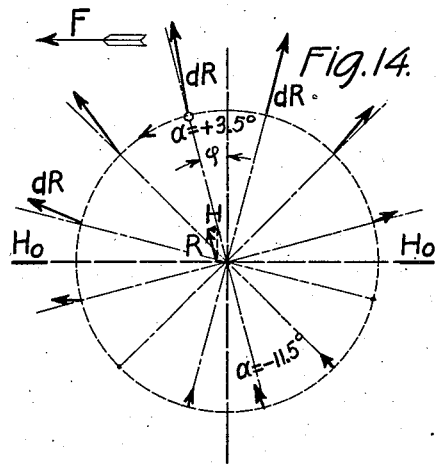
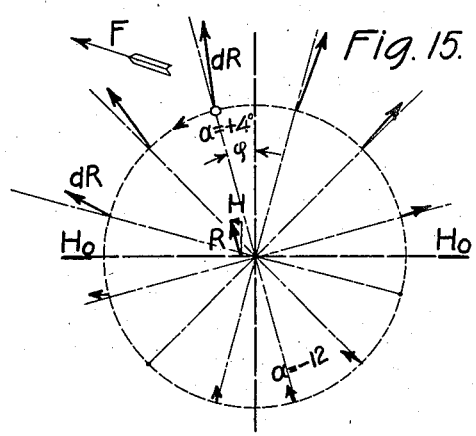
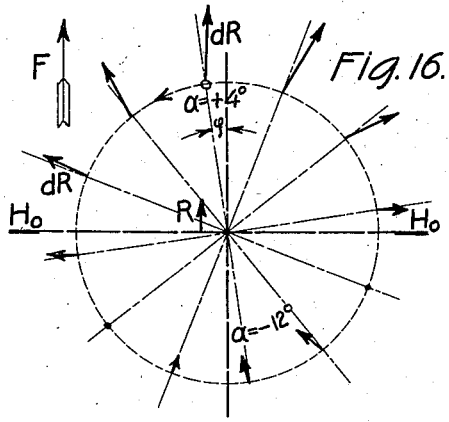
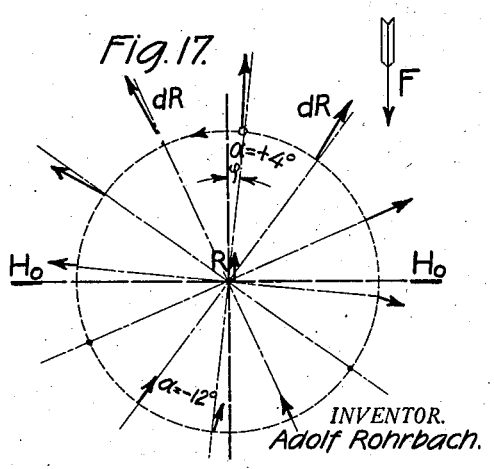
INVENTOR.
Adolf Rohrbach.
BY Edwards, Bower & Pool
ATTORNEYS.

July 19, 1938.  A. ROHRBACH  2,123,916
AIRCRAFT
Original Filed Aug. 8, 1933   11 Sheets-Sheet 5
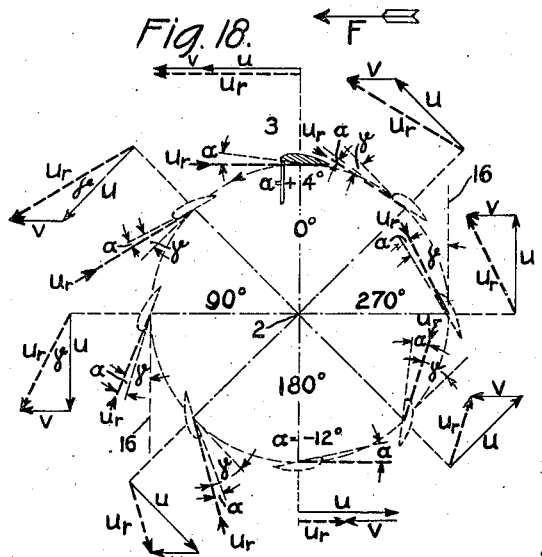
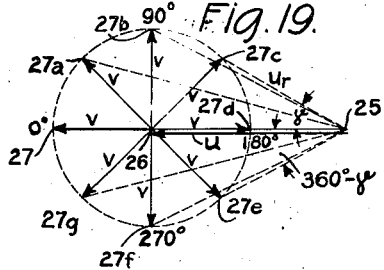
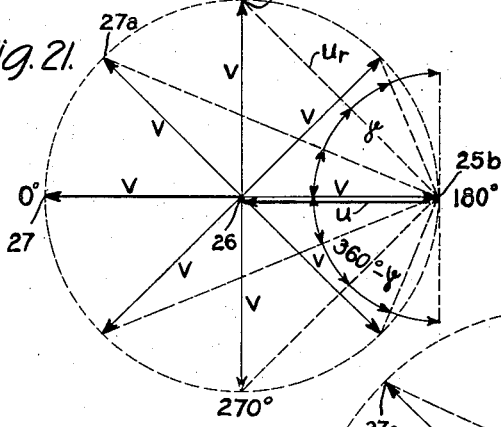
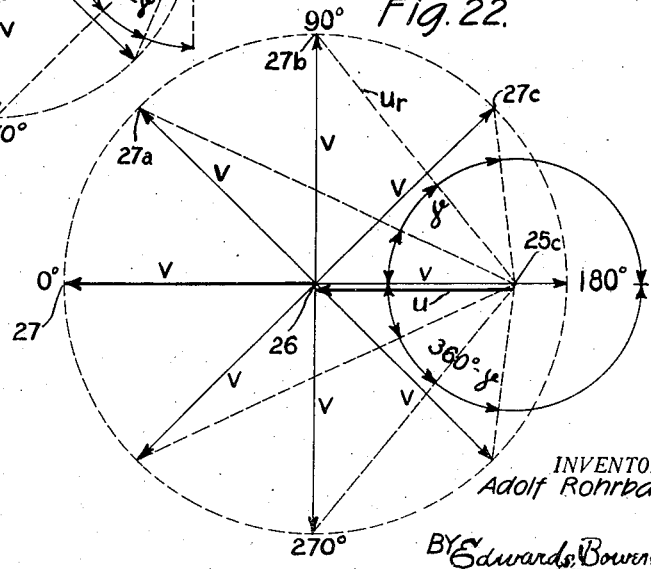
INVENTOR.
Adolf Rohrbach.
BY Edwards, Bower, Pool
ATTORNEYS.

INVENTOR.
Adolf Rohrbach
BY Edwards, Bower & Pool
ATTORNEYS.

INVENTOR.
Adolf Rohrbach.
BY Edwards, Bower & Poot
ATTORNEYS.

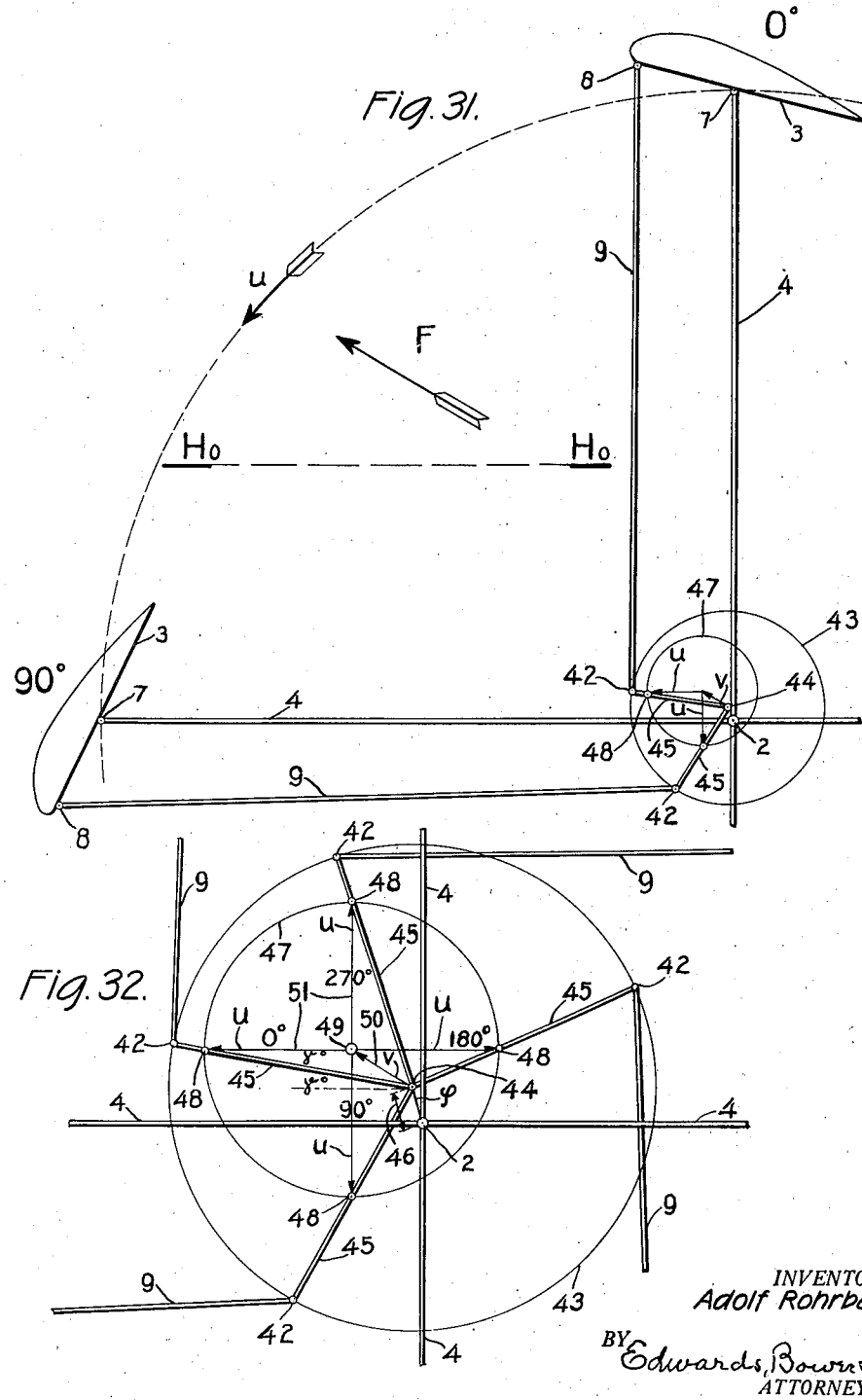

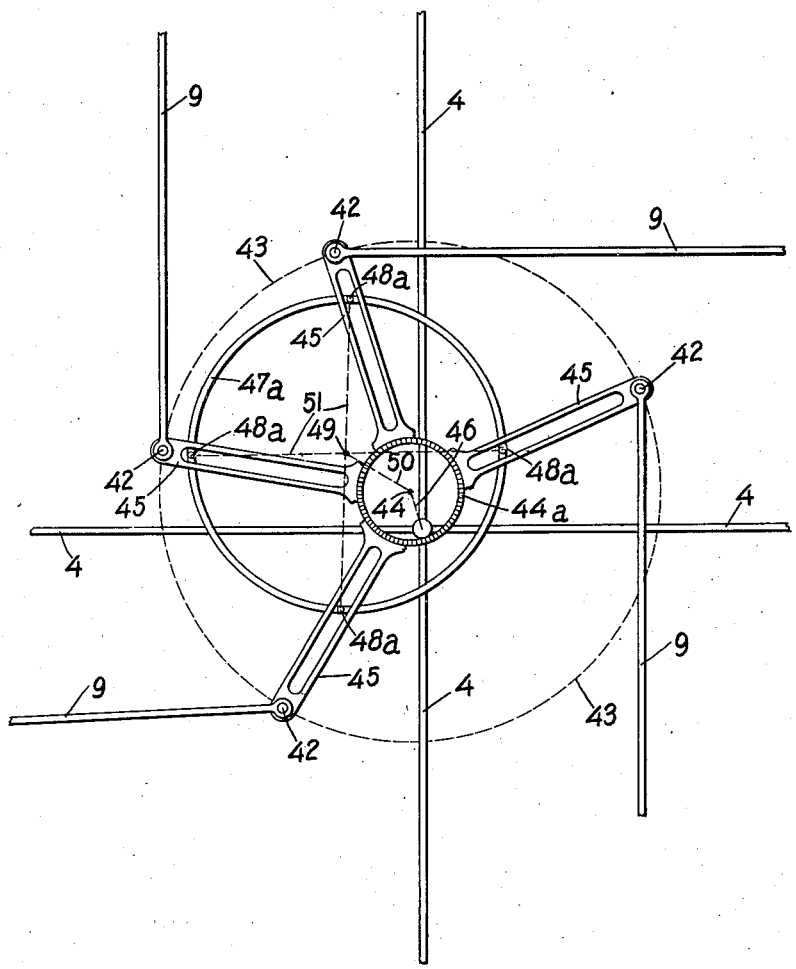

July 19, 1938.  A. ROHRBACH  2,123,916
AIRCRAFT
Original Filed Aug. 8, 1933  11 Sheets-Sheet 10

INVENTOR
Adolf Rohrbach
BY
Edwards, Bower & Pool
ATTORNEYS

July 19, 1938.　　　A. ROHRBACH　　　2,123,916
AIRCRAFT
Original Filed Aug. 8, 1933　　11 Sheets-Sheet 11

INVENTOR
Adolf Rohrbach
BY
Edwards, Bower & Pool
ATTORNEYS

Patented July 19, 1938

2,123,916

UNITED STATES PATENT OFFICE 2,123,916

AIRCRAFT

Adolf Rohrbach, Berlin-Wilmersdorf, Germany, assignor to Rohrbach Patents Corporation, Dover, Del., a corporation of Delaware Application August 8, 1933, Serial No. 684,268. Renewed October 18, 1937. In Germany August 9, 1932

27 Claims. (Cl. 244—20)

This invention relates to aircraft of the oscillating wing type and has for its general object to provide a new and improved aircraft of that type.

Systems heretofore proposed for controlling the revolving wings of aircraft of this type have failed to produce the physically and aerodynamically correct angles of incidence of the wings relative to the resultant airflow, and as a consequence aircraft embodying such systems have not been practically successful. It is the primary object of the present invention to produce a wing-controlled system whereby the angles of incidence will be aerodynamically correct relative to the resultant airflow for all wing positions so that under substantially all conditions of flight the wings will operate efficiently, resulting in the production of a practicable and effective aircraft of this type.

In carrying out the invention controllable oscillating wings are provided which are caused to revolve bodily about a central axis and which by a predetermined periodical variation, occurring during each bodily revolution, of their angular positions relative to tangents to the circle of revolution, produce lifting forces or propelling forces or both lifting and propelling forces to produce the desired results.

To the above and other ends which will subsequently appear my invention consists in the features of construction, combinations of devices and arrangements of parts hereinafter described and particularly pointed out in the claims.

The invention will be described and explained in connection with the accompanying drawings which illustrate the preferred form of the invention and also certain principles necessary to a full and correct understanding of the invention.

In the drawings Fig. 1 is a side elevation of an aircraft of the kite type to which the invention is applied;

Fig. 4 is a view more or less diagrammatic illustrating revolving wing and associate controlling devices in various positions during the circle of revolution;

Fig. 5 is a diagrammatic view showing produced or developed for one full revolution the angles hereinafter denominated "alpha" of a wing relative to the respective tangents to the circle of revolution, and also the correct values for certain flight conditions of the angles "delta" so called, resulting from aerodynamically correct values of alpha;

Fig. 6 is a diagram illustrating graphically the differences between the curves of Fig. 5;

Fig. 7 illustrates schematically a revolving wing and certain controlling devices therefor;

Figs. 8 and 9 are diagrammatic views for the Fig. 7 construction and correspond to the diagrammatic views Figs. 5 and 6;

Fig. 12 is a schematic view illustrating resultant air forces of a revolving wing under slow-flight conditions the wing being controlled by an oscillation hereinafter designated as the alpha-oscillation;

Fig. 13 is a schematic view illustrating resultant air forces of the wing shown in Fig. 12 under high speed flying conditions;

Figs. 14-17 are diagrammatic views illustrating resultant air forces acting on a revolving wing controlled by the alpha-oscillation and a later to be described phi-oscillation;

Fig. 18 is a diagram illustrating primarily for different wing positions the periodically varying angles hereinafter denominated the gamma angles;

Figs. 19-22 are diagrammatic views illustrative of the oscillations hereinafter termed the gamma oscillations which occur under varying conditions;

Figure 23:
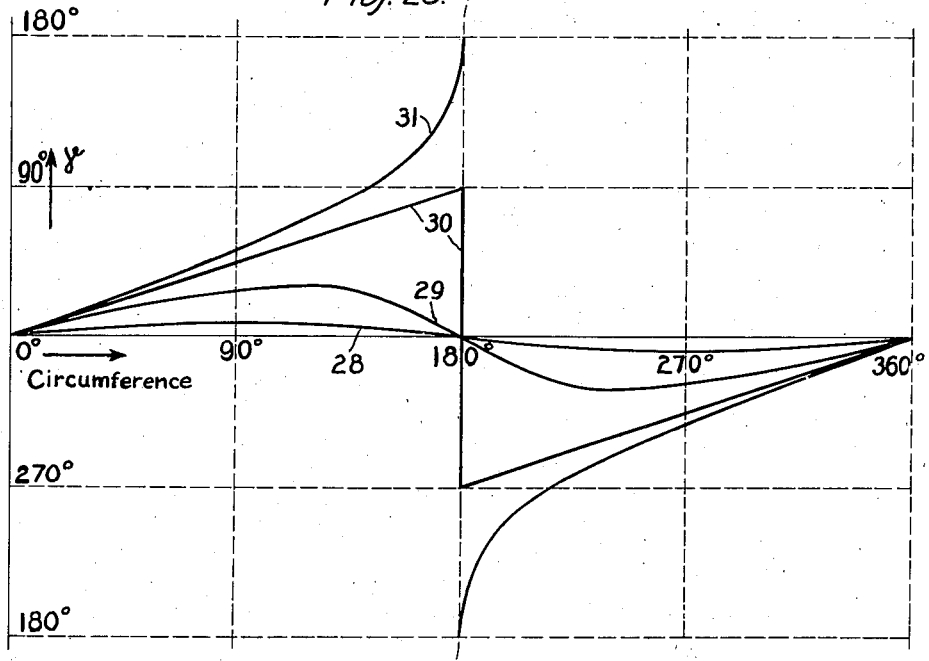
Fig. 23 shows the developed curves of the values of the so-called gamma oscillations for particular conditions as hereinafter described.
Figure 24:
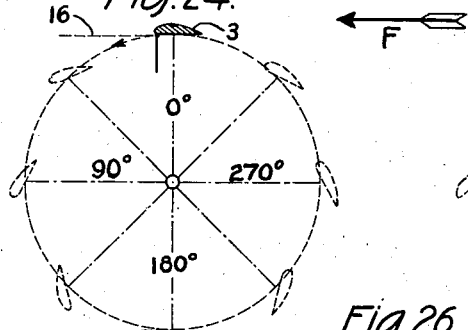
Figure 25:
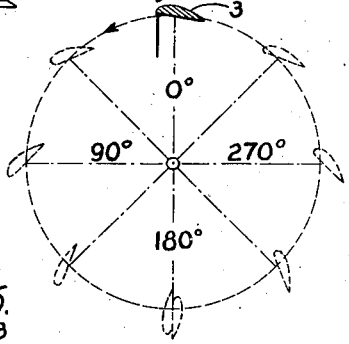
Figure 26:
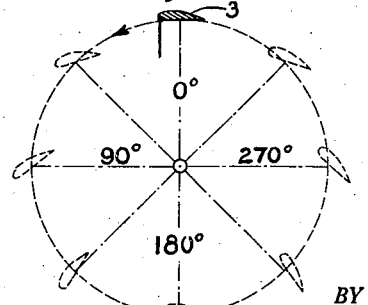
Figure 27:
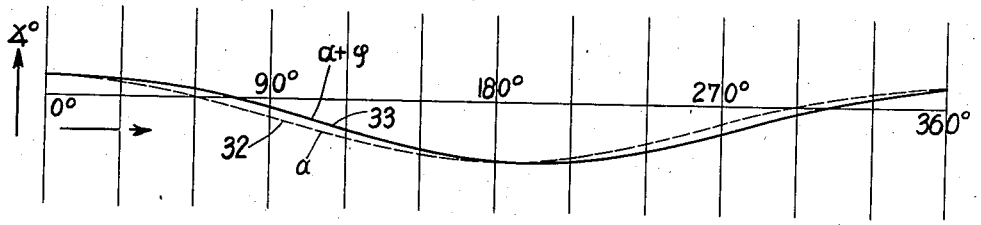
Figure 28:
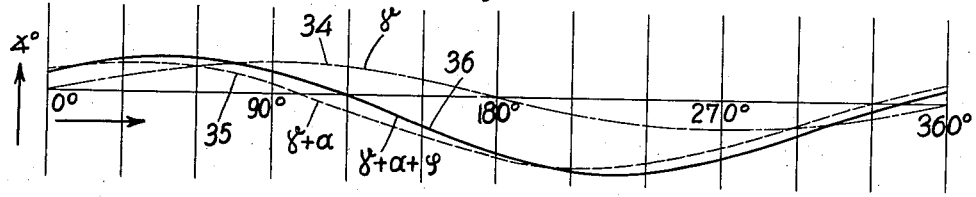
Figure 29:
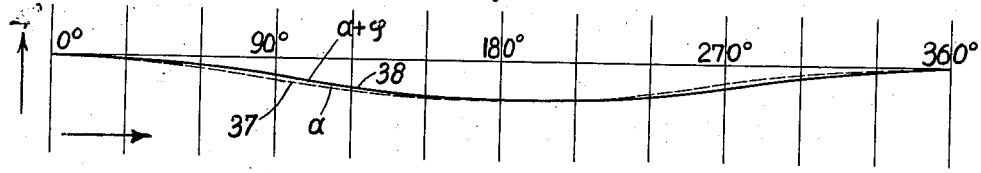
Figure 30:
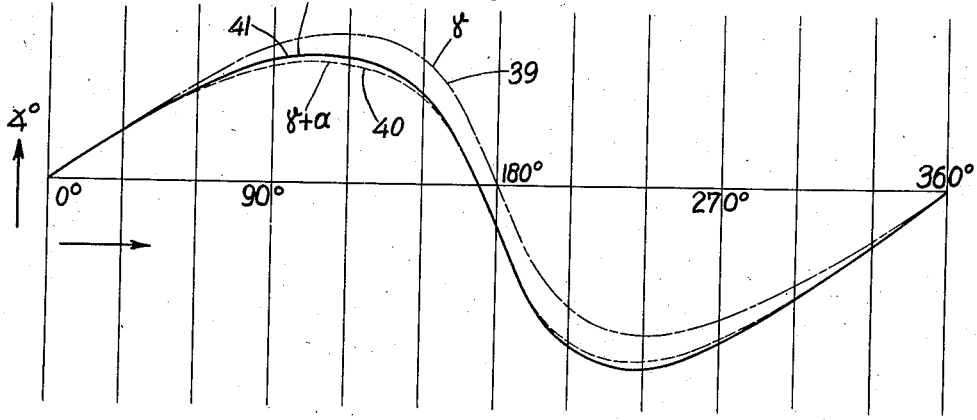

Figs. 24-26 inclusive illustrate angular positions of the wing for the corresponding curves plotted in Fig. 23;

Figs. 27-28 are diagrammatic views illustrative of the combined gamma and alpha oscillations so-called under conditions of slow-flight; and Figs. 29 and 30 are diagrammatic views illustrating the combined gamma-, alpha- and phi-oscillations under conditions of high speed flight;

Fig. 31 is a view more or less diagrammatic illustrating wing control devices in the nature of oscillation gear mechanism;

Fig. 32 is a corresponding view on an enlarged scale of certain parts illustrated in Fig. 31; and Fig. 33 is a fragmentary view of certain of the devices illustrated schematically in Fig. 32.

Figure 34:
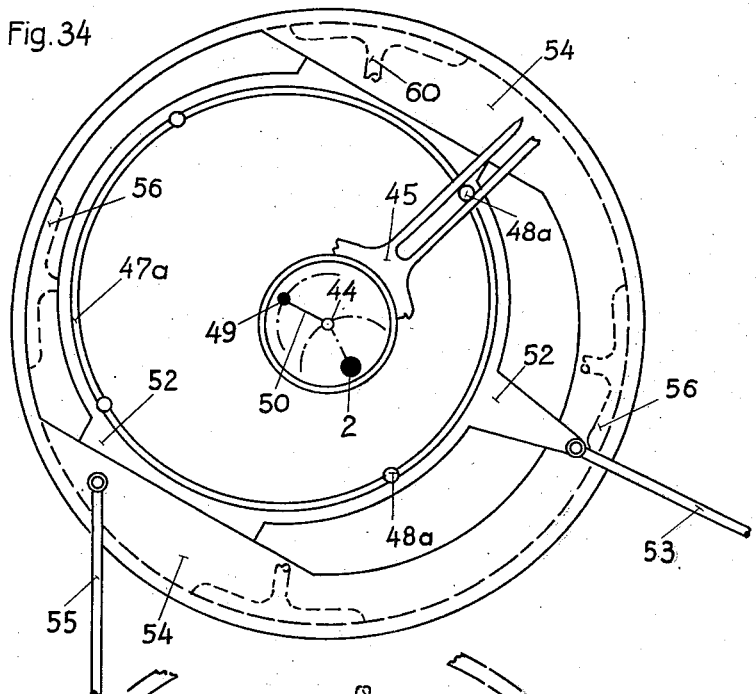
Figure 35:
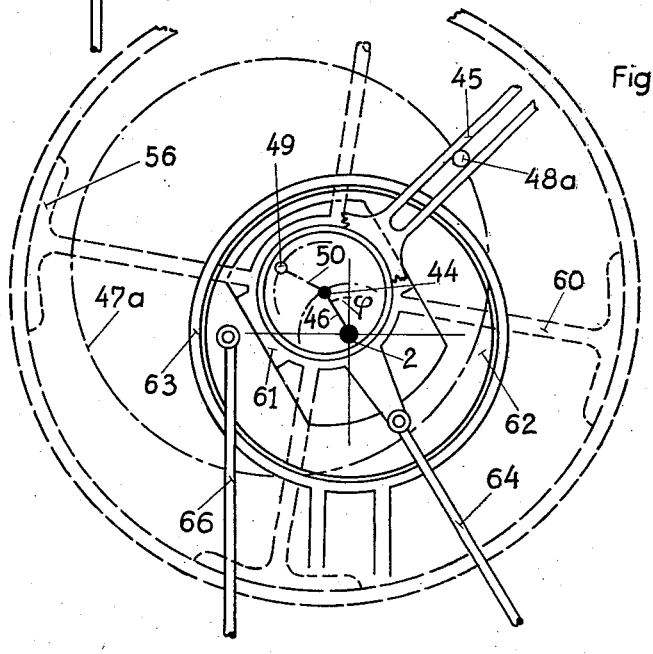
Figures 36, 37:
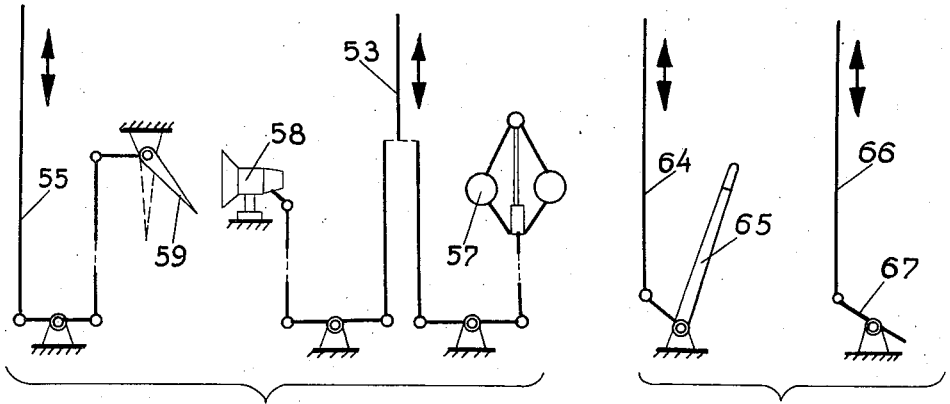
Figure 38:
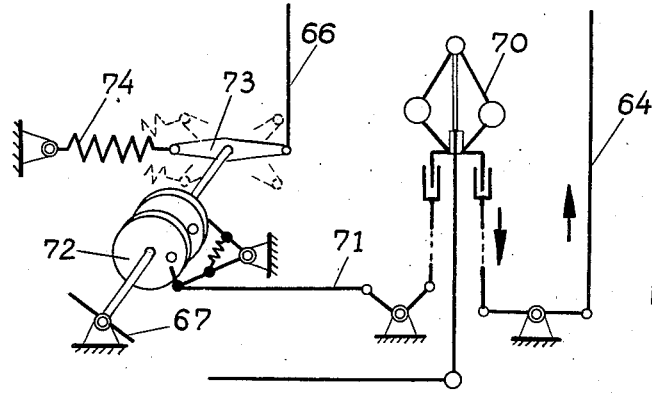
Figure 39:
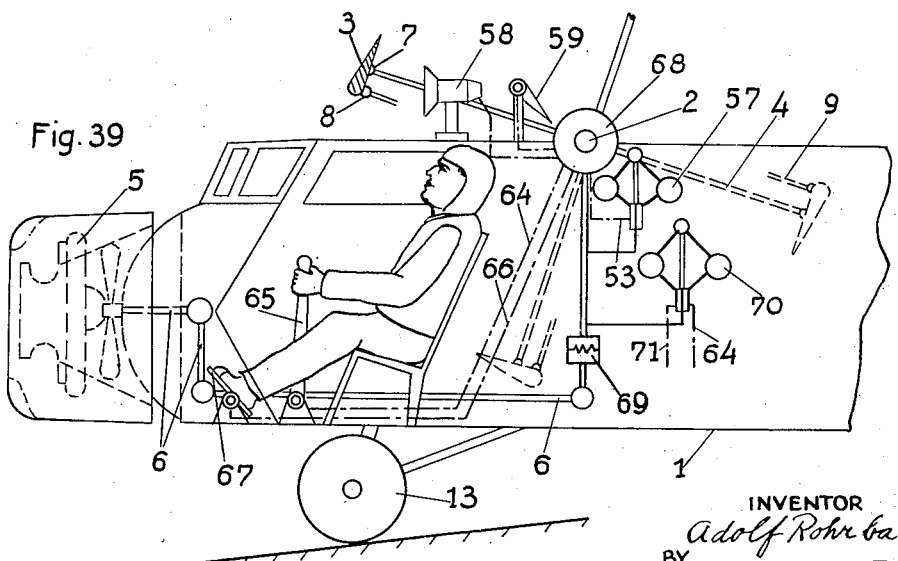

Fig. 34 is a schematic view by way of example of a γ oscillation gear;

Fig. 35 is a schematic representation of an α oscillation gear, also indicating means for variation of an angle φ;

Fig. 36 is a view of γ control members;

Fig. 37 represents α and φ control members;

Fig. 38 is a schematic view of devices provided for the autorotation of the wings;

Fig. 39 represents the front section of an aircraft fuselage with control members indicated.

In the following description and appended claims the words "gear" and "gearing" are used in their broad sense, meaning mechanism or the like.

Figure 1:
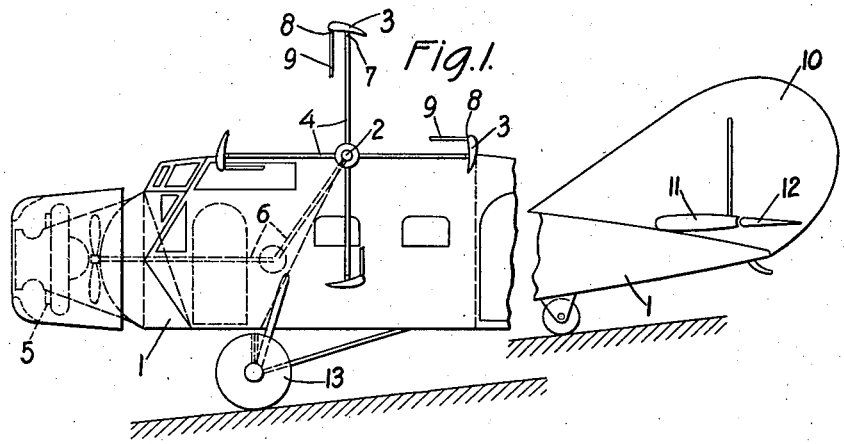
Figure 2:
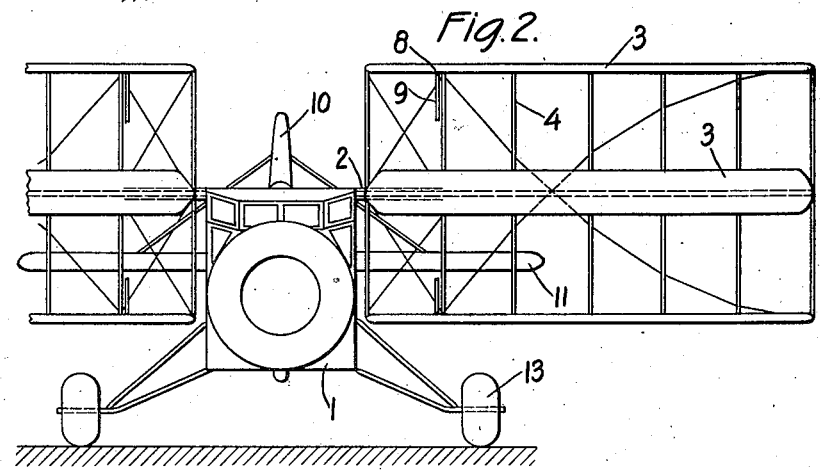
Fig. 2 is a front elevation of said aircraft.
Figure 3:
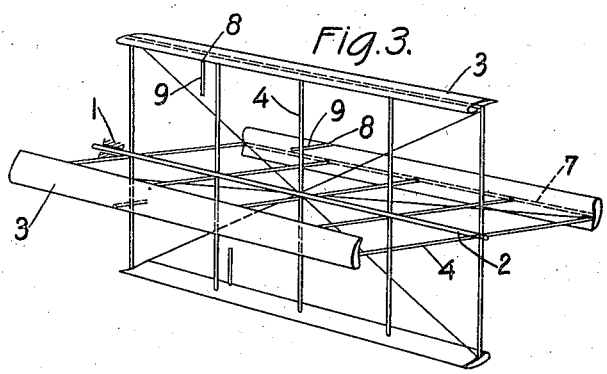
Fig. 3 is a perspective view of the revolving wings.

Referring first to the aircraft as illustrated in Figs. 1-3, the fuselage as a whole is designated as 1. Suitably mounted thereon transversely to the direction of flight are horizontal shafts 2 from which revolving wings 3 are supported by radial spokes or arms 4. A motor 5 conventionally illustrated and mounted in the nose of the aircraft is provided to drive the shafts 2 through intermediate connecting devices indicated at 6. The wings 3 have axes 7 at the ends of the arms 4 about which axes said wings are periodically oscillated during each revolution about the central axis 2 by means comprising control rods 9 connected at 8 to the associate wings 3 and operative through mechanical gearing of suitable type. A vertical rudder or fin 10 is provided, as well as a stabilizer 11 and elevator 12 of an adjustable horizontal tail unit, and an undercarriage 13 of suitable construction, all as conventionally illustrated.

In order that the principles of the present invention may be fully understood, it is desirable at this point to refer somewhat more in detail to the constructions of the prior art for kite aircraft of the revolving wing type and the principles on which the prior systems were based. In the prior art systems, two chief methods of wing oscillation were employed, first the so-called sinus-oscillation system which chiefly by means of an eccentric varies the angles of the wings relative to the respective tangents to the circle of revolution approximately according to a sine law; and second, the normal intersection system, which controls the angular positions of the wings relative to the circle of revolution, so that the normals to all wing positions intersect more or less precisely, in one and the same point.

In the first of these methods it was proposed to use for the sinus-oscillation a displaceable eccentric, the center of which could be shifted on a circular course around the center of the circle of revolution in order to vary the direction of the eccentricity, and later an alteration of the amount as well as of the direction of the eccentricity was provided for either by means of two independently rotatable eccentrics, one of which embraced the other, or by displacing one eccentric in two different directions.

An oscillation effected by this method necessarily produces at higher translational speeds alternatively too small and too large aerodynamical angles of incidence of the wings relatively to the resultant air flow, and this basic defect consequently results in a serious loss of aerodynamic efficiency and so makes impossible an economical forward flight. This will be understood by reference to Figs. 4-6 of the drawings.

Fig. 4 shows, for higher translational speeds of the aircraft and for the direction of flight F, a revolving wing 3 oscillated by means of a control rod 9 connected to a ring 14, the center 15 of which is eccentric to the shaft 2 and the amount and direction of this eccentricity being adjustable. The so produced angles delta (indicated on the drawings by the Greek letter δ) of the wing relative to the respective tangents 16 to the circle of revolution, for one full revolution, are shown in Fig. 5 plotted over the straightened out periphery of the circle of revolution by the curve 17 which is of an approximately sinus-shaped character.

The working effect of such a sinus-oscillation depends upon the angle alpha between the revolving wing 3 and the resultant airflow ur (resulting from the circumferential velocity u and the velocity v of the airflow through the circle of revolution) as shown in Fig. 4. If this angle is either larger or smaller than the aerodynamically efficient range of the angles of incidence of the wing section, then the airflow around the wing is disturbed and the aerodynamical efficiency of the wing is seriously reduced. For certain flight conditions the correct values of the angles delta resulting from the aerodynamically correct values of alpha are given in the dotted curve 18 of Fig. 5. The amounts of the angular incorrectnesses, i. e. the differences between the curves 17 and 18 are represented by the curve 19 of Fig. 6. Curve 19 shows that a sinus oscillation produces angular incorrectnesses of 10° and more with respect to the correct angle alpha. Since the aerodynamically useful angles of incidence alpha of the wings comprise only a relatively limited angular range, it is clearly evident that the disadvantages of the angular incorrectness of a sinus oscillation are very serious.

It may be noted, that the above mentioned symbols ur, u and v may be understood to indicate both movement of the wing relative to the air and the movement of the air relative to the wing.

Referring to the second of the prior systems or methods, the so-called normal intersection system, it was at first proposed to provide for a peripheral displacement only of the normal intersection point around the center of the circle of revolution. Later it was proposed to displace the normal intersection point in any desired direction, i. e. radially as well as peripherally around the shaft, in order to make possible an adaptation of the wing oscillation to different conditions of flight. But even this kind of wing oscillation, particularly for low speed conditions, results in inefficient angles of incidence on a considerable part of the circle of revolution. (See Figs. 7-9 of the drawings.)

Fig. 7 shows a revolving wing 3 controlled by the control-rod 20, vertically and rigidly connected to the wing and so guided by sliding stones in slide rails, not represented in the drawings, that the direction of the control rod 20, during each revolution always passes through the fixed point 21, the so-called "normal intersection point" the radial and peripheral position of which relative to the shaft 2 can be controlled by the pilot.

For this oscillation and for a slow flight condition, the angles "delta" (indicated on the drawings by the Greek letter δ) between the wing 3 and the respective tangents 16 to the circle of revolution are plotted in Fig. 8, as the full curve 22 over the straightened out periphery of the circle of revolution. For the same conditions of flight, the aerodynamically correct values of delta resulting from correct angles alpha are shown by the dotted curve 23 of Fig. 8. The amounts of the angular incorrectness, i. e. the differences between curves 22 and 23 are given in curve 24 of Fig. 9, indicating by how many degrees the angle of incidence alpha of the wing is too large or too small relative to the aerodynamically correct angle alpha.

With either of the two aforementioned oscillation systems, for certain conditions of flight the revolving wings require an unreasonably high amount of motor power. This loss of power is caused by the sinus oscillation at high translational speeds, i. e. during most of the flying time, and therefore costs much fuel besides resulting in engine depreciation. By the normal intersection oscillation the loss of power is caused at low translational speeds, with the result of a substantial reduction of the weight which can be lifted in vertical ascent, with a given wing surface and motor power.

With either of the aforementioned oscillation systems, at best only two values are variable, namely: amount and direction of the eccentricity of the eccentric with the sinus oscillation systems, and radial and peripheral position of the normal intersection point with the normal intersection oscillation systems.

In contrast with the prior systems the present invention is based on recognition of the fact that in order to adapt correctly the angular oscillation, physically or aerodynamically, to every condition of flight and to every point of the circle of revolution, not only two but six different values have to be taken into consideration, viz:

(1) Direction of the revolving velocity of the wings.

(2) Amount of the revolving velocity of the wings.

(3) Direction of the velocity of the airflow through the circle of revolution relative to the aircraft.

(4) Amount of the velocity of the airflow through the circle of revolution relative to the aircraft.

(5) Direction of the air-force required by the different flying conditions.

(6) Amount of the air-force required.

The amount and direction of the air flow velocity are determined by the direction of flight of the aircraft and by the downwash caused by the wings.

It is impossible to take care of the second, third, fourth, fifth and sixth values, five in all, by means of a mechanism with only two variables, that is by varying the peripheral and radial position of the center of the eccentric under the first of the prior systems or varying the peripheral and radial position of the normal intersection point under the second system. Moreover, the pilot under either of these prior systems would have no means of ascertaining just which adjustment of the two variables would produce comparatively the best efficiency with regard to the conditions of flight obtaining at the moment.

By the present invention means are provided for the independent controllability of five variable values, thus making it possible to adjust and use the most efficient aerodynamical angles of incidence of a revolving wing, with equal precision as with the fixed wings of kite aeroplanes. Without the fulfillment of these basic physical requirements it would be impossible to construct revolving wings of reasonable efficiency. Similar to the fixed wings of a kite type airplane, the most efficient angles of incidence of a revolving wing depend on certain dimensions and design factors, and they depend besides on the load carried, on the flying altitude and flying speed of the aircraft.

Figure 10:
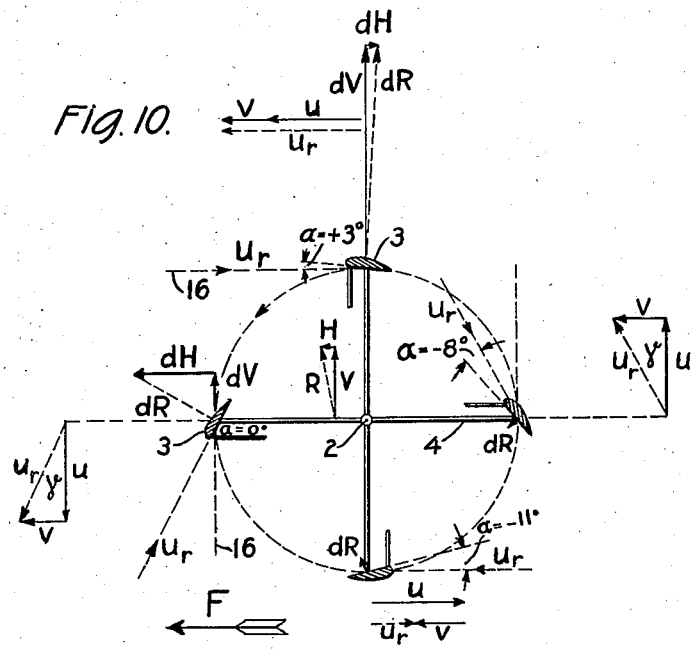
Fig. 10 is a diagrammatic view disclosing one of the principles of the invention by showing four different positions of a wing on a cycle of revolution and illustrative of air-force conditions in those positions.
Figure 11:
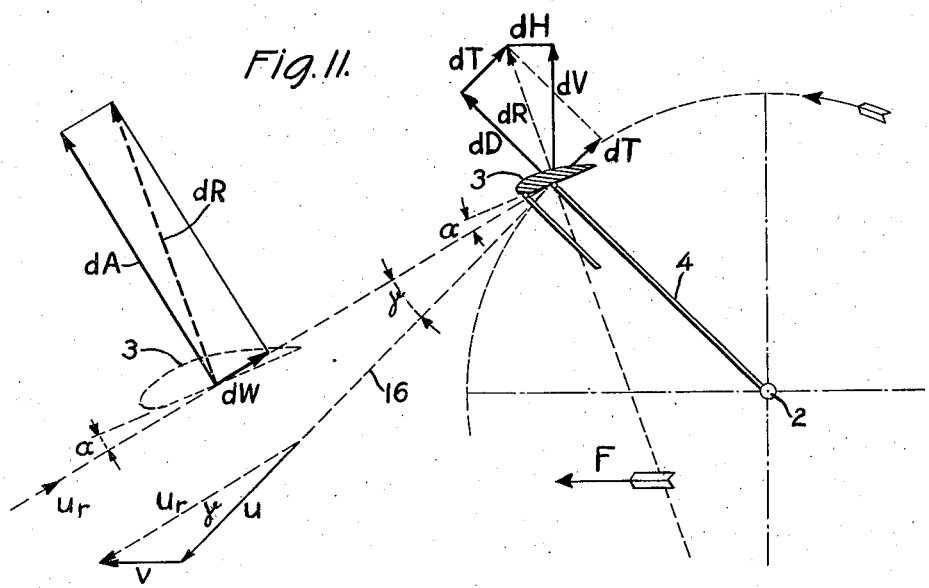
Fig. 11 is a diagrammatic view on an enlarged scale of the air-force conditions in relation to one position of the revolving wing.

These points will be best understood by reference to the remaining figures of the drawings, wherein Figs. 10 and 11 are illustrative of airforce conditions; Figs. 12–17 show the effects of an alpha and phi oscillation, so called; Figs. 18–26 show the working effect of the gamma oscillation, so called; Figs. 27–30 are illustrative of the superpositioning of the three oscillations; and Figs. 31–33 illustrate a form of oscillation mechanism for carrying out the principles of the present invention.

In the interest of brevity, certain sure forms of expression involving characters of the Greek alphabet have been adopted. The effective angle of incidence of the wing is called the alpha ($\alpha$) angle. A periodical variation of the alpha angle during each revolution is called the alpha oscillation, and the control of this alpha oscillation obtained by means for producing alterations of lift and accelerations or retardations thereof is called the alpha control. A variation of the angle of incidence of the revolving wings on the circle of revolution can be made to produce in addition to the lift a variable horizontal force, the phi ($\varphi$) variation, and means for producing this is called the phi control. The position of the revolving wings is adjusted to the varying direction of the resultant airflow by means called the gamma ($\gamma$) control, resulting in variation of the corresponding angle called the gamma ($\gamma$) angle, which is located between the directions of the resultant airflow $ur$ and of the revolving velocity $u$. The angular motion of the gamma variation of the revolving wings is necessary in order to obtain a correct effect of the alpha ($\gamma$) and phi ($\varphi$) variations due to the fact that the translational velocity of the air relative to the aircraft is variable in value and direction as is also the revolving velocity $u$ in varying operating conditions.

Referring now to Figs. 10–11, the wing oscillation is not based primarily on the tangent 16 by the present invention but is based on the direction varying for each condition of flight and for every point of the circle of revolution, of the resultant airflow $ur$, resulting on the one hand, from the amount and direction of the circumferential velocity $u$ of the revolving wing 3 and, on the other hand, from the amount and direction of the velocity $v$ of the airflow through the circle of revolution, this velocity $v$ resulting from the translational speed of the aircraft and from the speed of the downwash.

Fig. 10 shows, by way of example, four different positions of a wing or air-foil 3 on the circle of revolution. For these positions the air-force $dR$, its horizontal component $dH$ and vertical component $dV$ are represented. The sum R of all components $dR$ belonging to one revolution of the wing, as well as the horizontal components H and vertical components V of R are also shown in these drawings.

Fig. 11 is illustrative on an enlarged scale of the conditions pertaining to a given position of a revolving wing. Fig. 11 shows the lift component $dA$ and the drag component $dW$ forming the resultant force $dR$, and furthermore the components $dH$ and $dV$ of $dR$ as well as the radial component $dD$ and the tangential component $dT$ of $dR$. The aforementioned resulting airflow $ur$, mechanically represented by means of the hereinafter, described gamma-oscillation, forms the angles gamma with the respective tangents 16 to the circle of revolution. These angles gamma are variable in every point of the circle of revolution as well as for different operating conditions, because they are varying on the one hand, in accordance with the direction and amount of the revolving velocity $u$ and, on the other hand, in accordance with the direction and amount of the translational velocity $v$ of the aircraft, as well as in accordance with the direction and amount of the velocity of the downwash.

As already indicated, according to my invention the revolving wings are so oscillated that relatively small angles of incidence alpha of a predetermined value, remaining within the aerodynamically efficient angular range of the wing incidence, are formed between the wing and the abovementioned resultant airflow direction $ur$. The value of the said angles alpha during each revolution of the wings is varied, by means of the hereinafter further described alpha-oscillation periodically within relatively small limits, in such a manner that the working effect of the wings, in every point of the circle of revolution and for every flight condition is similar to the working effect of the fixed wings of kite aeroplanes, and that the most effective portion of the polar curve of the wings is utilized in order to avoid, as far as possible, aerodynamical losses.

This new kind of wing oscillation, resulting from the combined effect of the alpha- and gamma-oscillation, for the first time has made it possible with revolving wings to control the amount and direction of the generated resultant air-force by an adequate adjustment of the alpha-oscillation, which is independent of the basic gamma-oscillation of the wings which is permanently in accordance with the momentary flight conditions.

The alteration during one revolution of the angle of incidence alpha relative to the resultant air-flow $ur$ follows the principle, that each wing shall work with a relatively high positive value of specific lift in the upper portion of the circle of revolution, and in the lower portion of the circle of revolution where its position is inverted with a negative value of specific lift, whereas in the front and rear portions of the circle of revolution where the air-forces can contribute but little to the lifting effect the wings shall work with a small aerodynamic resistance. The transition between these different wing positions can be made to follow various laws. The most simple and most convenient law for the purpose in question is the law of a sinus oscillation of a suitable amplitude and phase angle.

On the basis of the gamma-oscillation the alpha-oscillation allows the production of a maximum of lift components with a minimum of motive power. The amplitude of the alpha-oscillation can be varied in order to obtain, under various conditions of flight the amounts of lift required. In the slow flight conditions, e. g. for take off, a climb, hovering slow forward or backward flight, descent, a big alpha-oscillation amplitude allows the use of a large portion of the polar curve of the wing, ranging from a high positive to a negative value of specific lift. With high speed flying conditions, in the upper portion of the circle of revolution the circumferential velocity of the wings adds itself to the translational speed of the aircraft, so that the required lift can be produced with relatively small values of specific lift of the wing, i. e. with small aerodynamic angles of incidence, i. e. with a small amplitude of the alpha-oscillation.

Fig. 12 gives a schematical view of the resultant air-forces R of a revolving wing for slow flight conditions and with a large alpha-oscillation amplitude. The extreme angles of incidence of the alpha-oscillation amplitude are to be selected in accordance with the aerodynamical qualities of the respective wing section. In the example of Fig. 12 the values are—alpha = +4 in the upper and alpha = —12° in the lower portion of the circle of revolution.

Fig. 13 shows that with a high speed flying condition an equal amount of lift R is produced with a small amplitude of the alpha-oscillation, e. g. with alpha = 0° in the upper and alpha = —8° in the lower portion of the circle of revolution. By increasing or reducing the amplitude of the alpha-oscillation, the generated air-forces can be increased or reduced within certain limits without a change in flying speed.

The extreme values of the alpha-oscillation are determined in accordance with the special purpose of any given aircraft and with the conditions of flight. The amplitude can be changed by reducing or increasing either one or both extremes of the alpha-oscillation. The embodiment of the invention as described in the present specification uses, by way of example, for the alpha-oscillation a periodically varying sinus-oscillation, the amplitude of which can be steadily altered between two predetermined extremes of alpha.

In kite aeroplanes the wing for certain conditions of flight e. g. climbing, permanently works with a large angle of incidence. The revolving wing however works with a large aerodynamical angle of incidence only in the upper portion of the circle of revolution during very short periods. On the greater part of the circle of revolution the aerodynamical angles of incidence of the wing are relatively small. A breakdown of the airflow around the wing section and the risk of "stalling" the aircraft are therefore avoided with the revolving wing oscillation according to my invention.

Even relatively great alterations of the angle of the aircraft relative to the flight path caused by squalls or false manoeuvres will not cause an essential disturbance of the airflow through the circle of revolution nor an important alteration of the lift forces produced by the revolving wings.

While the amount of the generated air-force is influenced by the amplitude of the alpha-oscillation the direction of the generated air-force is controlled by the position, on the circle of revolution of the phase of the alpha-oscillation. Therefore the whole phase of the alpha-oscillation, and with it the point where the maximum of the angles of incidence alpha occurs, by means of the so-called phi-control can be displaced by an angle phi forward or rearward from the upper apex of the circle of revolution along the circle of revolution (see Figs. 14–17) in order to obtain a forward or backward inclination of the resulting air-force R. The horizontal component H resulting from the thus produced inclination of the air-force R varying for different flying conditions, forms the forward or backward propelling force and allows the dispensing with a propeller and can also be used for changing from slow flight to high speed flying, or vice versa.

Like the alpha-control the phi-control is independent of the gamma-control.

Figs. 14–17 are illustrative of the air-forces on a revolving wing for various conditions of slow flight, and for the positions of the flight path F relative to the horizon line H₀—H₀, as represented. Fig. 14 gives conditions of forward flight, the amplitude of the alpha-oscillation ranging from alpha =+3.5° to alpha =—11.5°, the phi-control being displaced to forward and the resultant air-force R therefore having a forward inclination, delivering a horizontal component H. Fig. 15 belongs to an inclined climbing flight, the phi-control being displaced to forward, the alpha-oscillation ranging from alpha =+4 to alpha =—12°, so that the air-force is slightly increased for the climb. Fig. 16 is illustrative of a nearly vertical ascent. Here also the phi-control must be slightly displaced to forward, in order to prevent the otherwise slight backward inclination of the air-force. Fig. 17 is illustrative of the conditions prevailing during a vertical descent with the wings autorotating without motor power. The position of the air-forces dR around the circle of revolution shows that contrary to the heretofore described other flight conditions they produce an autorotating effect in this case.

Since my invention permits the use of aerodynamically most effective part of the polar curve of the respective wing section for the alpha-oscillation, in order to obtain a maximum of flying efficiency in motor-driven flight as well as when the aircraft is descending without motor power and with the wings autorotating, the sinking velocity of the aircraft, in the latter case, can be reduced to the minimum.

Finally, the use of the polar curve allows the air-force values to be calculated for various flying conditions and to derive therefrom the flying performance figures, to compare the figures of different projected types of aircraft with revolving wings and to select the most promising type for construction.

Hitherto only an alteration of the adjustment of the entire oscillation system could produce an alteration of operating conditions. As contrasted with this by my present invention the desired result is obtained by a direct alteration of only the respective influential component of the totality of the gamma- and alpha-oscillation and of the phi-control, while the other components remain unchanged. For example, an alteration of the amount of the air-force can be effected to increase or reduce the lift for climb or descent merely by a suitable adjustment of the amplitude of the alpha-oscillation alone. In order to obtain an alteration of the direction of the air-force, e. g. to increase the propelling effect for accelerating purposes, the whole phase of the alpha-oscillation can be displaced by means of the phi-control.

The translational velocity of the air relative to the aircraft, variable in accordance with the varying airflow through the circle of revolution can be influenced independently of the adjustment of the alpha- and phi-oscillations, by the gamma-oscillation alone, while the amount and direction of the generated air-forces for any flying conditions can be controlled by the alpha-oscillation and the phi-control.

In an aircraft having a set of revolving wings on the right as well as on the left side for alterations of the direction of flight only the alpha-oscillation and the phi-control need be adjusted, differentially on both sides of the aircraft, while the gamma-oscillation can remain unchanged. In order to produce, for turning the aircraft about its longitudinal axis, the required difference of lift on either side the alpha-oscillation alone is adjusted differentially on both sides. For turning the aircraft about its vertical axis the required difference of propelling forces on either side is produced by a differential actuation of the phi-control alone. The alpha-oscillation as well as the phi-control can be adjusted in either parallel or opposed sense on both sides of the aircraft.

A control column or control stick is used preferably and by way of example in order to adjust the alpha-oscillation and foot levers or pedals serve to adjust the phi-control. The gamma-oscillation may be operated through the pilot or automatically. The said controlling devices can be actuated by the pilot so that similar movements of the aircraft are produced as with the controls of a normal airplane of the kite type.

The possibility of varying the operating conditions and actuating the aircraft controls by using separately only certain parts of the new oscillation system permits the air-forces produced by certain positions of the control levers to be determined with precision for every kind of manoeuvre.

An elevator and/or an adjustable horizontal stabilizer can be used in order to control the inclination of the aircraft around its lateral axis at higher speeds so that the most convenient equilibrium position of the aircraft fuselage is obtained.

In the case of autorotation without motor power or in case for any reason the revolving velocity of the wings sinks below a certain predetermined minimum value the gamma- and alpha-oscillations and the phi-control can be made to automatically assume the positions ensuring the slowest possible descent of the aircraft. This effect can be obtained e. g. by means of a centrifugal governor influencing the controlling devices eventually with the help of springs and notches.

As before explained the correct effect of my new kind of oscillation is obtained by superimposing the alpha-oscillation over the basic gamma-oscillation. Fig. 18 shows in schematical representation for different positions of the wing or air-foil 3 the periodically varying angles "gamma" which are enclosed between the directions of the resultant airflows $ur$ and the respective tangents 16 to the circle of revolution. Furthermore, Fig. 18 shows the angles of incidence alpha between the wing 3 and the directions of the resultant airflows $ur$. The displacement by means of the phi-control of the maximum value of ₀alpha and of the entire alpha-oscillation phase is not shown in the drawing for reasons of simplification.

Fig. 19 indicates for given conditions the mutual positions of $u$ and $v$. The position marked 0° (on the left) corresponds to the upper apex and the position marked 90° corresponds to the foremost point of the circle of revolution. Fig. 19 clearly shows the simple law of the gamma-oscillation which therefore can be produced by simple means e. g. by a tripartite crank mechanism with links 25, 26, 27. In this mechanism the member 25—26 corresponds in length to the value of the circumferential velocity $u$ of the wings, which is assumed to be practically unvariable during one revolution. The length and direction of the member 26—27 corresponds to the amount and direction of the airflow velocity $v$ through the circle of revolution. If the member corresponding to $v$ is revolved around point 26 synchronically with the wing while the other member corresponding to $u$ remains fixed, then the length and direction of the third member 25—27 (25—27a, 25—27b, 25 etc.) which is variable in length in order to connect the free end 25 of $u$ with the free end 27 of $v$, corresponds to the amount and direction of the resultant airflow velocity $ur$, and the angle gamma is enclosed between the member representing $ur$ and the member corresponding to $u$.

The angular velocity of the gamma-oscillation varies in accordance with an alteration of the ratio of $u/v$ only. Fig. 19 gives the values of gamma for $u/v=2$. Fig. 20 gives the values of gamma for $u/v=10$, the apex 25a of the angle gamma lying for outside. Fig. 21 is illustrative of the condition of $u/v=1$, the apex 25b of the angle gamma lying on the circle of revolution. Fig. 22 finally gives the values of gamma for $u/v=0.8$, apex 25c of gamma lying inside the circle. These figures illustrate the fact that the gamma-oscillation can be adapted to various ratios of $u/v$, by displacing the point 25 of a tripartite crank mechanism as indicated in the drawings.

In order to further explain the character of the gamma-oscillation the values of gamma are plotted in Fig. 23 for the abovementioned ratios of $u/v$, as curves over the straightened out periphery of the circle of revolution. In Fig. 23 curve 28 belongs to $u/v=10$, curve 29 to $u/v=2$, curve 30 to $u/v=1$, curve 31 to $u/v=0.8$.

For the conditions represented in curves 29—31 the angular positions of the wing are shown in Figs. 24-26. With a ratio of $u/v=2$ (Fig. 24) as well as with every other ratio of $u/v$ is greater than 1, the angular positions of the wing relative to the respective tangents 16 oscillate between two limits.

With a ratio of $u/v=1$, the wing has to perform a sudden turn in the lower apex of the circle of revolution. Because of the smallness of the aerodynamical forces which are occurring in the lower portion of the circle of revolution, with a ratio of $u/v=$nearly one, this 180° turn of the revolving wings could be performed much more gradually while a good deal of the lower part of the circle of revolution is traversed, without noticeable aerodynamical loss.

With a ratio of $u/v$ is less than 1, the gamma-oscillation would produce an angular wing oscillation relative to the direction of flight F, as indicated in Fig. 26.

With an adequate adjustment of the gamma-oscillation the range of $u/v$ is greater than 1 can be expected to be sufficient for most practiial purposes. For special purposes values of $u/v$ less than 1 might also be used.

The automatic adjustment of the gamma-oscillation may be caused by the combined controlling effect of a centrifugal governor which ascertains the number of revolutions of the revolving wings, of a wind vane to ascertain the airflow direction and of an air-speed indicator to ascertain the velocity of the airflow relative to the circle of revolution.

The design of the gamma-oscillation and therefore of the entire oscillation system can be simplified if the length of the member 25—26, corresponding to $u$, is left unchanged since as already indicated the angle gamma is determined by the ratio of $u/v$ only. With different flying conditions not only the amount but also the direction of $v$ may be different. It follows that in the gamma-oscillation system there need be two variables, the length and the direction of the member 26—27 which is corresponding to $v$, including the downwash component as hereinbefore described.

Over this basic gamma-oscillation the alpha-oscillation is superimposed. The total oscillation is represented in Figs. 27 and 28 for slow flight with $u/v=10$, and in Figs. 29—30 for high-speed flying with a ratio of $u/v=2$. Curve 32 of Fig. 27 shows the values of alpha computed over the respective points of the developed periphery of the circle of revolution, by way of example, for a sinus-shaped alpha-oscillation ranging from alpha=+4 in the upper apex (0°) to —12° in the lower apex (180°) of the circle of revolution. Curve 33 is illustrative of a displacement of the alpha-curve 32 by an angle phi by means of the phi-control, from the upper apex (0°) of the circle of revolution by a distance of 15° (phi=15°) in the forward direction, as hereinbefore explained. Fig. 28 shows the gamma-curve 34, and in curve 35 the superposition of the alpha-curve 32 over the gamma-curve 34, while the superposition of the combined alpha- and phi-curve 33 over the gamma-curve 34 results in curve 36 which for every point of the circle of revolution represents the aerodynamically correct angles delta between the wing 3 and the respective tangents 16 to the circle of revolution.

In Fig. 29 curve 37 shows a sinus-shaped alpha-oscillation ranging fom alpha=0° to alpha=—8°, while in curve 38 this same alpha-curve 37 is displaced to forward by an adequate angle phi. The pertaining values of gamma are given for a high speed flight condition in curve 39 of Fig. 30. Curves 40 and 41 are representations of the superposition over the gamma-curve 39, of the original alpha-curve 37 and of the alpha-curve 38 disposed by the angle phi respectively. Curve 41 therefore represents for the high speed flying condition the correct total oscillation of the wing relative to the respective tangents 16.

In an aircraft with two sets of revolving wings installed on both sides of the fuselage the basic gamma-oscillation is the same in both wing sets. A differential adjustment of the alpha-oscillation and of the phi-control on the right and left hand side of the aircraft can be used to generate different forces in either wing set in order to control the direction of flight of the aircraft. Therefore the basic gamma-oscillation can be produced for both sets of revolving wings by means of one and the same oscillation gear mechanism whereas the alpha-oscillation and phi-control must be separately controlled in the two wing sets. It is, however, possible to use instead of the before-described system of one gear mechanism for the gamma-oscillation and two alpha-oscillation and phi-control devices, an oscillation system wherein the gamma-oscillation also is generated independently on either side of the aircraft. According to my invention the oscillation controls may be operated in any desired sequence independently of the structural arrangement of the oscillation system. The oscillation mechanism can be placed within the fuselage or in a suitable position around the wing shaft. Fig. 31 shows, by way of example, a tri-partite oscillation gear mechanism. Fig. 32 is a schematical representation on an enlarged scale of parts of the oscillation mechanism. Fig. 33 illustrates, by way of example, a form of realization of this scheme.

The wings or air-foils 3 of streamlined design are each secured to associate spokes 4 and revolving around the shaft 2, are oscillated around the axis 7 by means of the control rod 9, attached to the wing 3 at point 8. The other end 42 of the control rod 9 describes with periodically varying speed a circular course 43 around the center point 44. The radial member 45 connects the end 42 of the control rod with the center point 44. The member 45 is equal in length to the distance between the points 7 and 8. The center point 44 during each revolution is stationary relative to the shaft 2, but it can be shifted by the alpha-oscillation control so that its distance 46 from the center of the shaft 2 corresponds to the desired amplitude of the alpha-oscillation. The connecting line between the center of the shaft 2 and the center point 44 is inclined, by the angle phi, by means of the phi-control against the perpendicular. The said control adjustments may be operated by the pilot by means of rods and levers as hereinbefore explained.

The radial members 45 revolving about the center 44 must be subjected to the law of the γ control. This is possible by retarding or accelerating them by means of a rotary circle 47 realizing the γ control and hereinafter called the γ oscillation gear circle. To this effect points 48 on the γ oscillation gear circle 47 drive the radial members 45, travelling on the latter to and fro. 49 is the central point of the γ oscillation gear circle 47. Distance 50 between the center 44 and the point 49 represents the airflow velocity $v$ relative to the shaft 2 in amount and direction. It can be varied in amount and direction by displacement of the central point 49. The value $u$ pertaining to the angle γ is represented by the radius 51 lying between points 48, 49. Said radius corresponds in length to the revolving velocity of the wing 3 and revolves synchronically with the latter about the central point 49, being thus always adjusted in the direction of the revolving velocity. As already explained it is practically advisable to keep constant the value $u$; therefore in the represented γ oscillation gear the radius 51 remains constant and the distance 50 is so adjusted as to obtain the correct angle γ corresponding to the ratio $u : v$.

Fig. 33 shows the radial members 45 formed as slotted levers, connected in point 42 to the rod 9 and supported freely turnable one besides the other one by the sleeve 44a, which corresponds to point 44 in Fig. 32. In the drawings the side-by-side arrangement of the radial members 45 is indicated. The control members which serve to adjust the sleeve 44a are not represented in the drawings. Stones 48a corresponding to points 48 in Fig. 33 engage the slots of the radial members 45, said stones being fastened on a ring 47a, corresponding in length or radius to the above-mentioned constant member 51. The said ring 47a revolves synchronically with the shaft 2. The center 49 of the said ring 47a does not revolve with the shaft 2 and is connected with the aircraft body by means of the control gear which serves to adjust the gamma-oscillation mechanism as desired. The center 49 of the ring 47a by means of the said not represented gamma control gear is displaceable such as by the distance 50 from the center 44 of the sleeve 44a. As described by this example the wings 3 are forced to oscillate by means of the governor rods 9 relative to the tangents 16 to the circle of revolution according to the combined effect of the alpha- and gamma-oscillations and the phi-control. There are, however, several other forms of construction with articulated levers, quadrant levers, cranks, toothed wheels, curve guides and the like, allowing the production and transmission onto the wings of an oscillation as hereinbefore described. It may be preferable to use instead of a direct control transmission for one and/or all oscillations, an indirect oscillation adjustment with intermediate members if necessary of the servo-type and eventually fitted with self-arresting devices.

Fig. 34 shows schematically an example of a γ oscillation gear. In Fig. 34 a γ oscillation gear ring 47a, with points 48a driving the radial members 45, is pivotally supported in a gliding body 52, the latter being displaceable in a bearing sleeve 54 by means of a linked rod 53. By this displacement the position of the central point 49 relative to center 44, i. e. the length of the distance 50 is altered. The variation of direction of distance 50 is effected by a rod 55 linked to and adapted to pivot the bearing sleeve 54 which latter is borne on shoes 56. Rods 53 and 55 are adjustable by γ control members. They may also be automatically adjusted through control members represented by way of example in Fig. 36. Rod 53 is adjusted by the combined effect of two members, e. g. a centrifugal member 57 operated in accordance with the revolving velocity of wings 3 and a Pitot tube 58 measuring the flying speed or the velocity of the air current respectively. A wind vane 59 influenced by the direction of the air current, is used to adjust rod 55. The combined effect of members 57, 58 and 59 therefore results in the automatic adjustment of the γ oscillation gear.

Fig. 35 shows by way of example an α oscillation gear. Shoes 56 of the γ oscillation gear, represented in Fig. 34 are through spokes 60 connected with a member 61 sliding in a body 62, the latter being pivotally borne in a sleeve 63 rigidly connected with the aircraft. By shifting the member 61 by means of a linked rod 64, the opposite end of which is connected with a control member or joy-stick 65 (see Fig. 37), the center 44 is displaced radially relative to the shaft 2 of the revolving wings, and thus the amplitude of the α wing-oscillation is adjusted. The peripheral displacement of center 44, i. e. the adjustment of the line 46 to the variable angle φ, is effected by rod 66 linked to the pivotal body 62, said rod 66 being adapted to be operated by a control member or footpedal 67 (see Fig. 37). The element or body 68 in Fig. 39 indicates the unit of the oscillation gears, every one of which is independently adjustable, as shown in Figs. 34 and 35. A free wheeling clutch 69 is introduced in the shaft line 6 leading from the motor 5 to the wing shaft 2 and allowing the wings 3 to autorotate, in case of reduced revolutions of the motor.

Fig. 38 is a schematic representation of a device, which in the event of motor failure or with reduced revolutions of the motor wings allows the latter to autorotate, at the same time adjusting the wing oscillation gears to the position of minimum sinking velocity. Above said free-wheeling clutch 69 a centrifugal governor 70 is connected, which in the event of loss of revolutions of the wings below a certain minimum value is adapted to so displace rod 64 connected with it, that the distance of center 44 from the revolving shaft 2 increases or assumes its maximum value respectively. Thus the α oscillation is automatically adjusted to its largest amplitude.

The angle φ at the same time should automatically vary to the most favorable value with respect to the α amplitude of the autorotation of the wings. To effect this the centrifugal governor, by means of rods 71 disengages a clutch 72 inserted between lever 73 of rod 66 and foot pedal 67 and adapted to neutralize the voluntary adjustment of the angle φ. Now rod 66 is only influenced by spring 74 connected with lever 73, said spring being adapted to maintain body 62 in such a position that angle φ assumes the said most favorable value.

When the γ oscillation gear is automatically operated, a separate adjustment for it in the event of autorotation of the wings can be dispensed with, members 57, 58 and 59 represented by way of example, being adapted to release the correct controlling effects even when the aircraft is descending with the wings autorotating.

The structural arrangement and the detail design of the revolving wings proper do not constitute the substance of this invention. Any desired number of revolving wings may be provided around one revolving shaft. The wings may revolve instead of around a circular cylinder, around a truncated cone. The revolving shafts of two sets of revolving wings on either side of the aircraft may be disposed with a dihedral or a sweep-back angle and the wings may be revolved oppositely to the direction described. The invention makes it possible to suddenly substantially retard the speed of the aircraft so that collisions can be avoided even in poor visibility, near the ground or near mountain ranges. Another particular advantage is the high degree of controllability over the entire speed range from maximum forward speed down to hovering, as well as with backward flight. Landing risks are reduced and over-stress on the wings does not result even in heavy squalls or under violent flying manoeuvring. Moreover, the high efficiency obtained with my invention affords a relatively great loading capacity of the aircraft while affording high flying speeds.

Other advantages will suggest themselves to those skilled in the art and various adaptations to analogous structures besides airplanes of the kite type, as well as variations in construction can be made without departing from the invention.

Having thus described my invention. I declare that what I claim as new and desire to secure by Letters Patent, is:

1. Aircraft, comprising a fuselage, a motor and a plurality of aerodynamically profiled wings revolving bodily on a substantially circular path about an axis transverse to the direction of aircraft motion under actuation of said motor, said wings being oscillated about their individual axes by an oscillation gearing, to alter their angles of oscillation periodically in a determined manner during the movement on the circle of revolution and to vary this period, said oscillation gearing being composed of an individually adjustable γ oscillation gear and an individually adjustable α oscillation gear, the γ oscillation gear comprising means for angularly accelerating and decelerating said oscillation gearing relative to the rotation of said wings whereby the wings in every point of the circle of revolution are set in the resultant airflow, said resultant airflow corresponding to the ratio of the direction and amount of the revolving velocity of the wings to the direction and amount of the velocity of the airflow through the circle of revolution relative to the aircraft and forming with the tangent to the circle of revolution an angle γ, the α oscillation gear comprising means for translating said oscillation gearing back and forth relative to a radius of said circular path of the wings thereby causing an additional periodical oscillation by which the wings relative to the said resultant airflow form in every point of the circle of revolution an angle of incidence α preventing the breakdown of the airflow.

2. Aircraft, comprising a fuselage, a motor and a plurality of aerodynamically profiled wings revolving bodily in a substantially circular path about an axis transverse to the direction of aircraft motion under actuation of said motor, said wings being oscillated about their individual axes by an oscillation gear system, to alter their angles of oscillation periodically in a determined manner during the movement on the circle of revolution and to vary this period, said oscillation gear system comprising an individually adjustable γ oscillation gear and an individually adjustable α oscillation gear, the γ ocillation gear comprising means for angularly accelerating and decelerating said oscillation gear system relative to the rotation of said wings whereby the wings under all operating conditions of the aircraft including take-off, slow flight, high speed flight, hovering flight, backward flight, ascent and descent and in every point of the circle of revolution are set in the momentary resultant airflow, said resultant airflow forming with the tangent to the circle of revolution an angle γ and corresponding to the ratio of the direction and amount of the revolving velocity of the wings to the direction and amount of the velocity of the airflow through the circle of revolution relative to the aircraft, the α oscillation gear comprising means for translating said oscillation gear system back and forth relative to a radius of said circular path of the wings thereby causing an additional periodical oscillation by which the wings also under all operating conditions relative to the said resultant airflow form in every point of the circle of revolution a relatively small angle of incidence α preventing disturbance of airflow.

3. Aircraft according to claim 2, wherein the adjustable α oscillation gear comprises an α control member and a φ control member, said control members allowing to be individually operated without influencing the γ oscillation and without mutual interference, the α control member adapted to vary the additional period of the α oscillation both to large amplitudes for slow flight conditions and to small amplitudes for high speed flying, the φ control member adapted to displace the additional period of the α oscillation by an angle φ fore and aft along the circle of revolution in accordance with the required direction of the air force.

4. Aircraft, comprising a fuselage, a motor and a number of aerodynamically profiled wings, the latter revolving bodily on a substantially circular path about an axis transverse to the direction of aircraft motion and adapted to be driven by the motor, the wings being oscillated about their individual axes by an oscillation gear, to alter these angles of oscillation periodically in a determined manner during the movement on the circle of revolution and to vary this period, said oscillation gear being composed of an individually adjustable γ oscillation gear and an equally individually adjustable α oscillation gear, the γ oscillation gear comprising means for angularly accelerating and decelerating said oscillation gear relative to the rotation of said wings whereby the wings under all operating conditions of the aircraft in every point of the circle of revolution are set in the momentary resultant airflow, said resultant airflow corresponding to the ratio of the direction and amount of the revolving velocity of the wings to the direction and amount of the velocity of the airflow through the circle of revolution relative to the aircraft, and forming with the tangent to the circle of revolution an angle γ, the α oscillation gear comprising means for translating said oscillation gear back and forth relative to a radius of said circular path of the wings thereby causing an additional periodical oscillation, by which the wings relative to the said resultant airflow form, also under all operating conditions, in every point of the circle of revolution a small angle of incidence α preventing the breakdown of the airflow, the adjustable α oscillation gear comprising an α control member and a φ control member, said control members allowing to be individually operated without influencing the γ oscillation and without mutual interference, the α control member adapted to vary the additional period of the α oscillation, the φ control member adapted to displace the additional period of the α oscillation by an angle φ fore and aft along the circle of revolution in accordance with the required direction of the air force.

5. Aircraft, comprising a fuselage, a motor and on each side of the fuselage at least one set of aerodynamically profiled wings, the wings of each set revolving bodily on a substantially circular path about an axis transverse to the direction of aircraft motion and adapted to be driven by the motor, said wings being oscillated about their individual axes by an oscillation gear, to alter these angles of oscillation periodically in a determined manner during the movement on the circle of revolution and to vary this period, said oscillation gear being composed of an individually adjustable γ oscillation gear and for each wing set of an equally individually adjustable α oscillation gear, the γ oscillation gear comprising means for angularly accelerating and decelerating said oscillation gear relative to the rotation of said wings whereby the wings under all operating conditions of the aircraft in every point of the circle of revolution are set in the momentary resultant airflow, said resultant airflow corresponding to the ratio of the direction and amount of the revolving velocity of the wings to the direction and amount of the velocity of the airflow through the circle of revolution relative to the aircraft and forming with the tangent to the circle of revolution an angle γ, the α oscillation gears of the wing sets being adjustable both individually and conjointly and comprising means for translating said oscillation gear back and forth relative to a radius of said circular path of the wings thereby causing an additional periodical oscillation by which the wings of the sets relative to the said resultant airflow form in every point of the circle of revolution a small angle of incidence α preventing the breakdown of the airflow.

6. Aircraft according to claim 5, wherein each α oscillation gear comprises an α control member adapted to vary the additional period of the α oscillation both to large amplitudes for slow flight conditions and to small amplitudes for high speed flying, said α control members being adjustable without influencing the γ oscillation.

7. Aircraft according to claim 5, wherein each α oscillation gear comprises an α control member, adapted to vary the additional period of the α oscillation both individually and conjointly.

8. Aircraft according to claim 5, wherein each α oscillation gear comprises a φ control member adapted to displace the additional period of the α oscillation by an angle φ fore and aft along the circle of revolution of each wing set in accordance with the required direction of the air force, said φ control members allowing to be operated both individually and conjointly without influencing the γ and α oscillations.

9. Aircraft according to claim 5, wherein each α oscillation gear comprises an α control member and a φ control member, said control members adapted to be operated without influencing the γ oscillation, the α control members adapted to vary the additional period of the α oscillation of the wing sets and to be operated both individually or conjointly in the same or contrary sense, the φ control members adapted to displace the additional period of the α oscillation of each wing set by an angle φ fore and aft along the circle of revolution in accordance with the required direction of the airforce, said φ control members allowing to be operated both individually and conjointly without influencing the α oscillation.

10. Aircraft according to claim 5, wherein each oscillation gear comprises an α control member and a φ control member, said control members adapted to be operated without influencing the γ oscillation, the α control members adapted to be operated by hand both individually and conjointly for the purpose to vary the additional period of the α oscillation both to large amplitudes for slow flight conditions and to small amplitudes for high speed flying, the φ control members being adjustable both individually and conjointly in the same or contrary direction and adapted to displace the additional period of the α oscillation of each wing set by an angle φ fore and aft along the circle of revolution in accordance with the required direction of the air force on each side of the fuselage, without influencing the α oscillation.

11. Aircraft according to claim 5 wherein only a common γ oscillation gear is provided for the sets of revolving wings on both sides of the fuselage.

12. Aircraft according to claim 5, wherein each set of revolving wings is provided with a γ oscillation gear said oscillation gears being capable of operation by a single means.

13. Aircraft, comprising a fuselage, a motor and on each side of the fuselage at least one set of aerodynamically profiled wings, the wings of each set revolving bodily on a substantially circular path about an axis transverse to the direction of aircraft motion and adapted to be driven by the motor, said wings being oscillated about their individual axes by an oscillation gear, to alter these angles of oscillation periodically in a determined manner during the movement on the circle of revolution and to vary this period, said oscillation gear being composed of an individually adjustable γ oscillation gear and for each wing set of an equally individually adjustable α oscillation gear, the γ oscillation gear comprising means for angularly accelerating and decelerating said oscillation gear relative to the rotation of said wings whereby the wings under all operating conditions of the aircraft in every point of the circle of revolution are set in the momentary resultant airflow, said resultant airflow corresponding to the ratio of the direction and amount of the revolving velocity of the wings to the direction and amount of the velocity of the airflow through the circle of revolution relative to the aircraft, the α oscillation gear comprising means for translating said oscillation gear back and forth relative to a radius of said circular path of the wings thereby causing an additional periodical oscillation, by which the wings relative to the said resultant airflow form in every point of the circle of revolution a small angle of incidence α, the aircraft to be turned about its longitudinal axis by means of the independently adjustable α oscillation gears on both sides of the fuselage, the said α oscillation gears comprising each an α control member, adapted to vary the additional period of the α oscillation to large or small amplitudes on both sides of the fuselage and without influencing the γ oscillation, the aircraft being turned about its vertical axis by means of φ control members, said φ control members forming part of the α oscillation gears and being individually adjustable without influencing the γ and α oscillations and adapted to displace the additional period of the α oscillation by an angle φ fore and aft along the circle of revolution in accordance with the required direction of the air force, the aircraft to be turned about its transverse axis by means of an elevator.

14. Aircraft according to claim 4, wherein automatic means are provided for auto-rotation of the wings and for adjusting the wing oscillations to the position of minimum sinking velocity of the aircraft, said means consisting of a disconnectible connection between motor and revolving wings adapted to let the wings revolve automatically without motor impulse and of means for adjusting the periodical α oscillation to largest amplitudes.

15. Aircraft according to claim 4, wherein automatic means are provided for auto-rotation of the wings and for adjusting the wing oscillations to the position of minimum sinking velocity of the aircraft, said means consisting of a disconnectible connection between the motor and revolving wings adapted to let the wings revolve automatically and of means becoming effective when the number of revolutions of the revolving wings decreases for adjusting the periodical α oscillation to largest amplitudes.

16. Aircraft according to claim 2, wherein the oscillation gear comprises an α control member and radial members radiating from a common body, the other end of each radial member being attached to the oscillation means of a wing, these ends revolving on a circular path with the said body as center, said center being displaceable in a distance from the revolving axis of the wings by the α control member of the adjustable α oscillation gear, said distance determining the amount of the amplitude of the additional α oscillation and not revolving about said revolving axis.

17. Aircraft according to claim 2, wherein the oscillation gear comprises an α control member, a φ control member and radial members radiating from a common body, the other end of each radial member being attached to the oscillation means of a wing, these ends revolving on a circular path with the said body as center, said center being displaceable in a distance from the revolving axis of the wings by the α control member of the adjustable α oscillation gear, said distance determining the amount of the amplitude of the additional α oscillation and not revolving about said revolving axis, said center adapted to be shifted by means of the φ control member fore and aft by an angle φ without influencing the γ and α oscillations, thereby displacing the whole phase of the α period along the circle of revolution in accordance with the required direction of the air force.

18. Aircraft according to claim 2, wherein the oscillation gear comprises an α control member, a φ control member and radial members radiating from a common body, the other end of each radial member being attached to the oscillation means of a wing, these ends revolving on a circular path with the said body as center, said center being displaceable in a distance from the revolving axis of the wings by the α control member of the adjustable α oscillation gear, said distance determining the amount of the amplitude of the additional α oscillation and not revolving about said revolving axis, said center adapted to be shifted by means of the φ control member fore and aft by an angle φ without influencing the γ and α oscillations thereby displacing the whole phase of the α period along the circle of revolution in accordance with the required direction of the air force, the length of the radial members being equal to the distance of the oscillating axis from the connection with the oscillation means of the wings.

19. Aircraft according to claim 2, wherein the oscillation gear comprises each an α, φ and γ control member and radial members radiating from a common body, the other end of each radial member being attached to the oscillation means of a wing, these ends revolving on a circular path with the said body as center, said center being displaceable in a distance from the revolving axis of the wings by the α control member of the adjustable α oscillation gear, said distance determining the amount of the amplitude of the additional α oscillation and not revolving about said revolving axis, said center adapted to be shifted by means of the φ control member fore and after by an angle φ without influencing the γ and α oscillations, thereby displacing the whole phase of the α period along the circle of revolution in accordance with the required direction of the air force, each radial member being connected to one point of the γ control gear, said points travelling on a circle and moving to and fro on the radial members, the central point of this circle not revolving and being adjustable in radial and peripheral direction relative to the center of said circular path by means of the γ control member of the adjustable γ oscillation gear.

20. Aircraft according to claim 2, wherein the oscillation gear comprises each an α, φ and γ control member and radial members radiating from a common body, the other end of each radial member being attached to the oscillation means of a wing, these ends revolving on a circular path with the said body as center, said center being displaceable in a distance from the revolving axis of the wings by the α control member of the adjustable α oscillation gear, said distance determining the amount of the amplitude of the additional α oscillation and not revolving about said revolving axis, said center adapted to be shifted by means of the φ control member fore and aft by an angle φ without influencing the γ and α oscillations, thereby displacing the whole phase of the α period along the circle of revolution in accordance with the required direction of the air force, each radial member being connected to one point of the γ oscillation gear, said points travelling on a circle and moving to and fro on the radial members, the central point of this circle not revolving and being radially and peripherally adjustable to angles γ by the γ control member of the adjustable γ oscillation gear, each angle γ being formed by the radial member and the line connecting the central point of said circle with the point moving to and fro on the radial member.

21. Aircraft according to claim 2, wherein the oscillation gear comprises an α control member, a φ control member and radial members radiating from a common body, the other end of each radial member being attached to the oscillation means of a wing, these ends revolving on a circular path with the said body as center, said center being displaceable in a distance from the revolving axis of the wings by the α control member of the adjustable α oscillation gear, said distance determining the amount of the amplitude of the additional α oscillation and not revolving about said revolving axis, said center adapted to be shifted by means of the φ control member fore and aft by an angle φ without influencing the γ and α oscillations, thereby displacing the whole phase of the α period along the circle of revolution in accordance with the required direction of the air force, the direction of the radial members being influenced each by a steering triangle of the γ control gear, one side of the triangle being formed by the radial member and representing a distance of variable length, one end of the distance being the center of said circular path, the other end being a point of attack of the γ control gear and displaceable to and fro on the radial member, the second side of the triangle having invariable length and revolving synchronically with the radial member, the third side of the triangle not revolving, means provided both to adjust this third side according to the direction of the velocity of the airflow through the circle of revolution and to vary its length in a manner, that the ratio of length of the second side to the third side is equal to the ratio of the revolving velocity of the wings to the velocity of the airflow.

22. In combination, a plurality of vanes and means to rotate them bodily in a circle of revolution about an axis parallel to their leading edges, means for oscillating said vanes about their respective longitudinal axes as they travel around the circle of revolution, and means rotatable in synchronism with said vanes and operatively connected to said oscillating means to impart thereto angular accelerations and decelerations relative to the rotation of the vanes, said accelerations and decelerations corresponding in direction and magnitude to the resultant of the circular and translational motions of said vanes at each point on the circle of revolution.

23. In combination, a plurality of vanes and means to rotate them bodily in a circle of revolution about an axis parallel to their leading edges, means for oscillating said vanes about their respective longitudinal axes as they travel around the circle of revolution, said means comprising relatively long and short articulated members which revolve with said vanes, and a member rotatable in synchronism with said vanes on a separate axis and operatively connected to the shorter of said articulated members to maintain it parallel to the resultant direction of the circular and translational motions of said vanes throughout the circle of revolution.

24. Aircraft according to claim 2 including in combination means for automatically adjusting the gamma oscillation gear according to the speed of the aircraft and the revolutions of the wings, and means for manually adjusting the alpha oscillation gear to manœuvre the aircraft.

25. Aircraft as in claim 2 in combination with means responsive to the translational velocity of the aircraft, means responsive to the revolutions of the wings, and means for impressing the combined effect of said responsive means upon and gamma oscillation gear.

26. In mechanism for actuating aircraft, the combination of a plurality of wings, motor means for causing said wings to revolve bodily in a substantially circular path about an axis transverse to the direction of motion of the aircraft, means for oscillating said wings about their individual axes as they revolve, said oscillating means comprising members receiving periodic radial motion and also comprising members receiving periodic angular motion relative to the corresponding radii of said circular path, said angular motion being distinct from the bodily revolving caused by said motor means, and means for adjusting the said angular motion in accordance with the resultant of the translational and revolving velocities of said wings.

27. In a machine adapted for relative translational motion with respect to the atmosphere, the combination of a plurality of vanes rotatable bodily in a substantially circular path about an axis transverse to the direction of such relative translational motion, means operatively connected to said vanes and positioning each vane parallel to the momentary directions resulting from the translational and rotational motions of each vane throughout its circular path and means for oscillating said vanes about the positions thus provided, to give them a periodically and non-symmetrically varying angle of incidence to the tangents of their circular path about said axis.

ADOLF ROHRBACH.